United States Patent [19]

Nagaishi

[11] Patent Number: 5,038,226
[45] Date of Patent: Aug. 6, 1991

[54] FACSIMILE APPARATUS
[75] Inventor: Tomio Nagaishi, Yokohama, Japan
[73] Assignee: Konica Corporation, Tokyo, Japan
[21] Appl. No.: 356,733
[22] Filed: May 25, 1989
[30] Foreign Application Priority Data May 30, 1988 [JP] Japan .................... 63-132053

[51] Int. Cl.⁵ .......................................... H04M 1/32
[52] U.S. Cl. ................................. 358/468; 358/404;
358/434
[58] Field of Search ............... 358/468, 402, 404, 434;
379/100

[56] References Cited
U.S. PATENT DOCUMENTS 4,811,385 3/1989 Watanabe ........................ 358/434

OTHER PUBLICATIONS

European Search Report No. EP 89305226, dated Mar. 4, 1990.
Patent Abstracts of Japan, vol. 10, No. 217 (E-423) to Yoshio, published Jul. 29, 1986.
Patent Abstracts of Japan, vol. 7, No. 284 (E-217) to Masanori, published Dec. 17, 1983.
Patent Abstracts of Japan, vol. 9, No. 169 (E-328) to Urita, published Jul. 13, 1985.
Patent Abstracts of Japan, vol. 12, No. 204 (E-620) to Hisao, published Jun. 11, 1988.

Primary Examiner—Edward L. Coles, Sr.
Attorney, Agent, or Firm—Finnegan, Henderson, Farabow, Garrett and Dunner

[57] ABSTRACT

A facsimile apparatus is provided having a image reader for photoelectrically reading information on a document and a communication device for calling a recipient and for transmitting the read information through a communication line. There is further provided a memory for storing the information. In this configuration, when the communication line of the recipient is detected as being occupied, the communication device stores the read information into memory once, and when the communication line is connected with that of the recipient by redialing operation, the communication device transmits the stored information from the memory.

1 Claim, 3 Drawing Sheets

FACSIMILE APPARATUS

BACKGROUND OF THE INVENTION

The present invention relates to a facsimile apparatus having an image memory capable of storing image information of a document.

Among various facsimile apparatuses, there is known a facsimile having an image memory capable of storing image information of a document.

For the aforesaid facsimile, the following examples of image memory applications are considered.

In one example, when a time-designated transmission mode or a same-information transmission mode is selected, image information of a document is read and then stored in the image memory before the start of transmission of the document for both cases. Then, after the completion of storage of the image information of the last document, an operator starts transmitting the stored image information.

In another example, a specific key is determined to be a key for memory-in use (a memory key) and image information of a document is stored in the aforesaid image memory when operating the memory key. Also in this case, the stored image information is transmitted through an operation by an operator.

When document-reading is started, without operating the memory-in key, the mode becomes an ordinary transmission mode. Therefore, when the circuit of a partner is not connected, connection to the circuit of the partner is a predetermined number of times. If the two apparatus still can not be connected, the document is ejected.

When the circuit of a partner is not connected during a transmission procedure in which a memory key is not used as stated above, the document is ejected after a certain period of time. Therefore, the operator is required to set up the same transmission procedure again after a certain period of time. Thus the transmission procedure is troublesome.

Further, when the image information of a document is stored in the image memory by the use of a memory key, there is no way for an operator to confirm that the documents' information has been transmitted without fail. This is because completion stamping, which is used for the purpose of confirming that the documents' information has been transmitted to the partner without fail after an ordinary transmission, is not carried out.

Further, when a same-information transmission mode is selected, completion-stamping is not carried out because processing is made without checking whether the partner is in use.

During the call for the circuit in the transmission when a memory key is not used, the document is not ejected. Therefore, it is not possible to transmit another document for the period until the suspension of the calling action by the completion of re-dialing action. Therefore, the utilization efficiency (the rate of operation) of the apparatus is very low.

The invention, therefore, offers a facsimile apparatus wherein the aforesaid problems have been solved by a simple structure, a simplification of the transmission procedure, and an improvement in the utilization efficiency.

SUMMARY OF THE INVENTION

In order to solve the aforesaid problems, the facsimile apparatus of the invention is characterized as an image memory capable of storing the image information of a document, the image information of the document is stored in the image memory when the apparatus is not connected to the circuit of a partner, and the image information stored in the image memory is transmitted automatically when the apparatus is connected to the partner circuit.

When connection cannot be made with the circuit of a partner, the image information of a document is stored in the image memory. Therefore, when a document is fed into the main body of the apparatus, optical reading of the document is carried out and the image information is stored in the image memory. As a result, when the image information of all documents is stored, there are not any un-processed documents on the document stacker of the facsimile apparatus.

After the image information of a document is stored in the image memory, the circuit of the partner for transmission is checked again to find out whether it is occupied or not. When connection is made, the image information stored is transmitted automatically to the partner.

When the circuit can not be connected despite re-dialing, the period when the facsimile apparatus can not be used is only the re-dialing period, which means that other queuing time can be utilized for transmitting other documents to other partners.

Therefore, it is possible to obtain a high utilization efficiency (the rate of operation) of the apparatus.

When the partner circuit is available, transmission is started directly without storing the image information in the image memory. In this case, it is possible to verify the state of transmission based on the completion stamp or the verification stamp because transmission completion-stamping is carried out on the document.

DETAILED DESCRIPTION OF THE INVENTION

An example of the facsimile apparatus of the invention will be explained in detail, and illustrated in the accompanying drawings.

Figure 1:
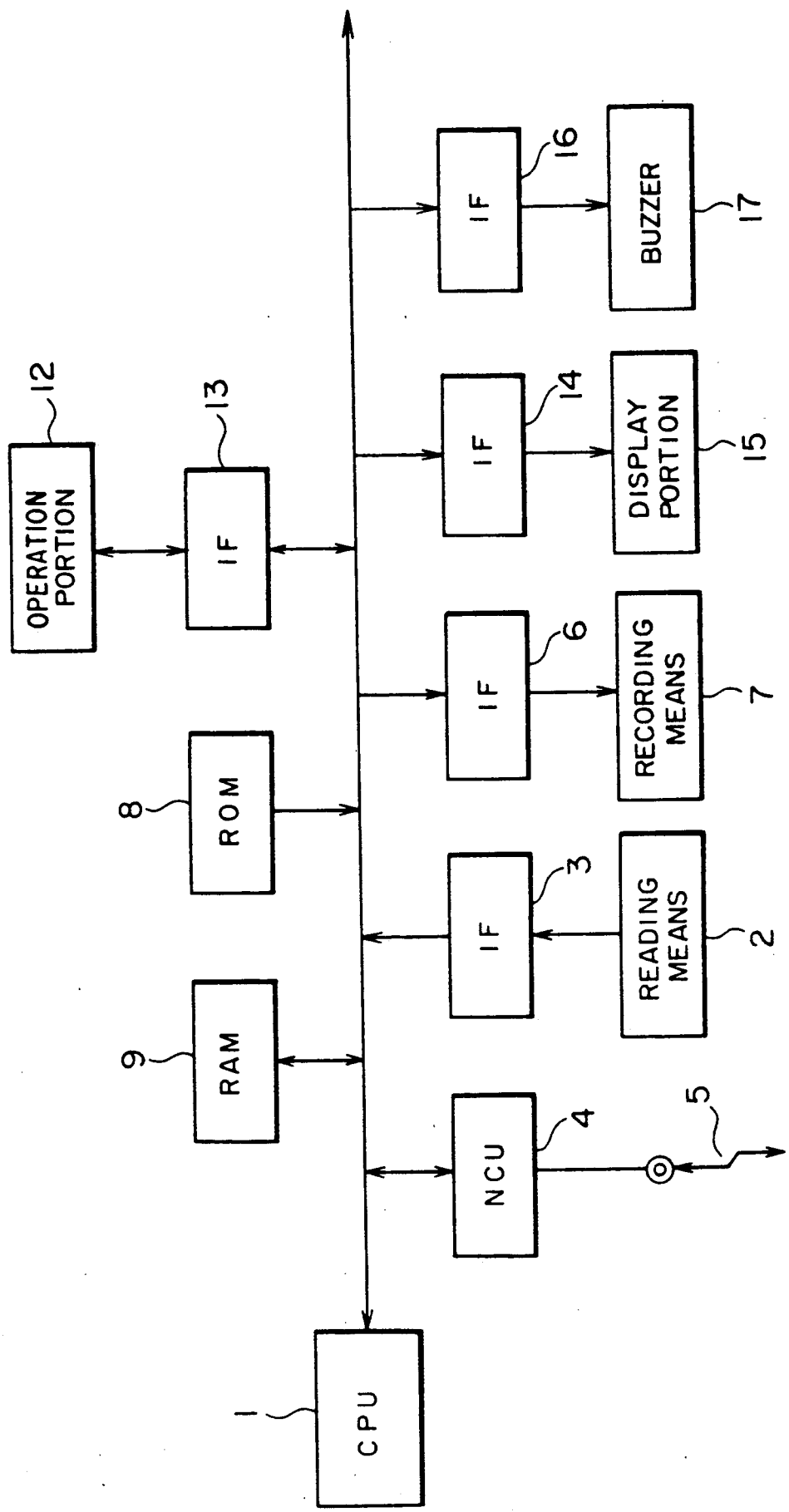
FIG. 1 is a schematic flow diagram showing an example of a communication control means of the facsimile apparatus of the invention.

FIG. 1 is a schematic flow diagram showing an example of the communication control means 10 incorporated in the facsimile apparatus of the invention having an image memory.

The communication control means is provided with CPU 1 which controls the document-reading, the control of telecommunication lines and transmitted-document-recording.

The image information of a document is read by reading means 2, the image information thus read is inputted into CPU 1 through interface 3, and then is transmitted to the partner via net control circuit (NCU) 4 and communication line (telephone line, leased line etc.) 5, after the necessary image processing is made on the image information.

The image information read by reading means 2, is stored, when necessary, in RAM 9 which forms an image memory. The image information thus stored can be transmitted.

The received image information signals, after being processed by CPU 1, are supplied to the recording means 7 via the interface device 6, and then the received image information is recorded onto heat-sensitive recording paper.

Numeral 8 represents ROM wherein various kinds of control programs are stored. The transmission program related to the invention is stored in ROM 8. The numeral 9, on the other hand, represents RAM which can be used as an image memory as stated above.

Further, the input from the keys of operation portion 12 provided on the facsimile apparatus main body is fed into CPU 1 via interface device 13, and thereby processing operation corresponding to the input is carried out. Numeral 15 represents a display portion and the state of display thereon is controlled through the interface device 14.

The display portion 15 is used for the display corresponding to the input from operation portion 12 as well as for the display of warnings such as that for overflow of image memory 9.

Similarly, buzzer 17 is also controlled, via interface device 16, by the command signals from CPU 1. Buzzer 17 is also used as a means for informing an operator of an insufficient capacity, such as an occurrence of an overflow of image memory 9.

Figure 2:
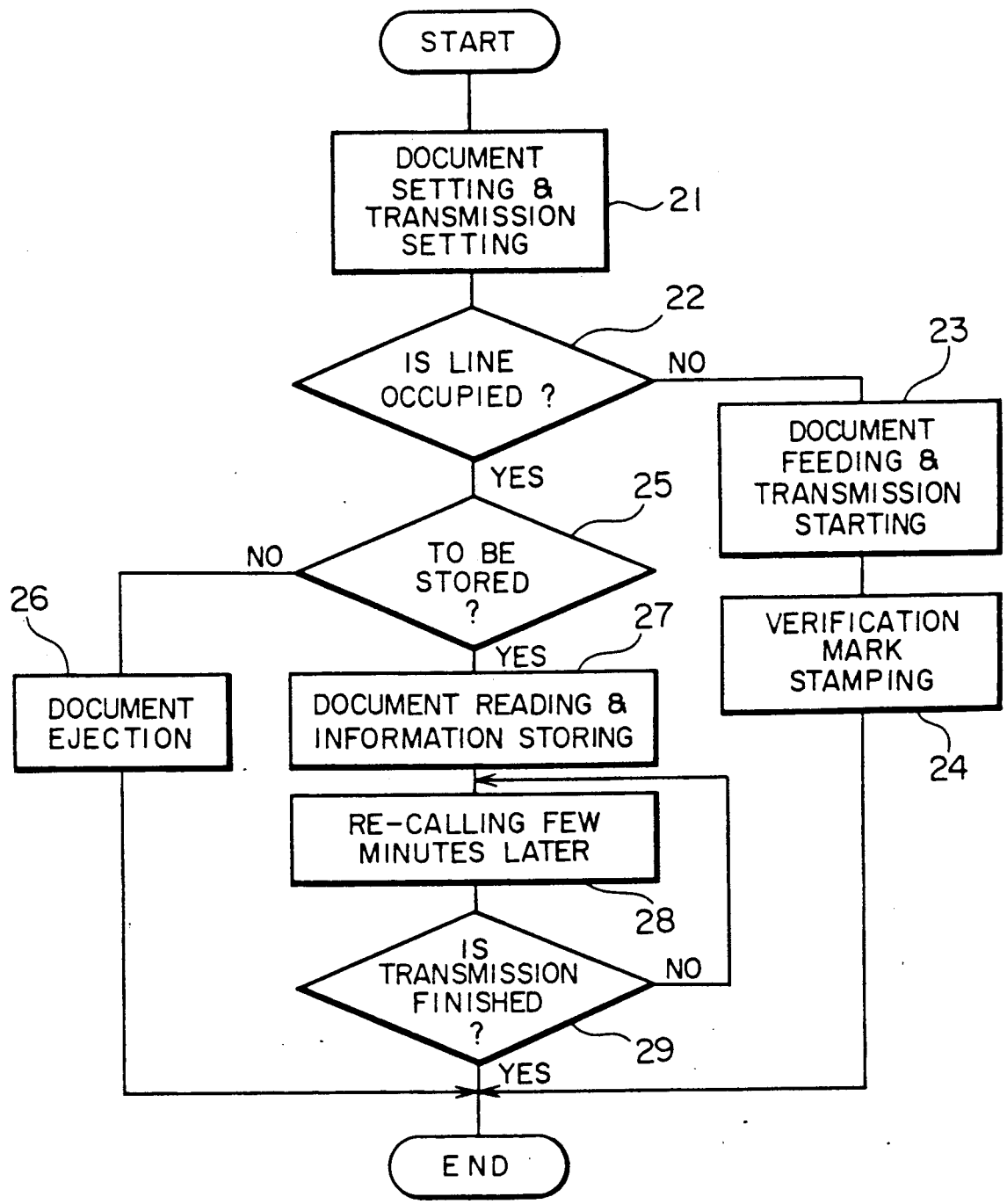
FIG. 2 is a flow chart showing an example of a transmission procedure routine related to the invention.

FIG. 2 is a flow chart showing an example of a transmission program related to the invention. In this transmission program routine 20, the transmission-start key is operated (step 21) when the documents are placed on the document-stacker provided on the main body of the apparatus.

Following this, connection to the partner circuit is attempted, and immediately upon connection, a document is fed and the document's image information is transmitted to the partner. After that, a completion stamp is affixed on each document (steps 22-24).

If, however, the partner circuit is occupied, a determination is made as to whether the image information on the document needs to be stored in image memory 9. When an operator does not set the key operation for storing the image information, namely when the check key is not operated, the document is ejected without any processing (steps 25 and 26). In this case, therefore, the document information is transmitted after the same transmission procedure is conducted again.

When the check key is operated, on the other hand, the document's information may be stored in the image memory 9 when the documents are fed sheet by sheet. A predetermined time after the image information on the last document is stored in image memory 9, the partner circuit is checked again to determine whether it is occupied (steps 27 and 28).

When it becomes possible to transmit, following attempted connections, the image information from image memory 9 is read out and is then transmitted. However, when the partner circuit is occupied during retransmission the partner circuit is checked again, after the period of predetermined time (step 29).

Thus, the partner circuit is checked to determine whether it is occupied, as in the conventional procedure, but it is also possible to use the facsimile apparatus in the period before the re-dialing procedure in step 28, because no un-processed documents are on the document-stacker. Therefore, it is possible to transmit other documents to other partners through an ordinary procedure. After other such transmissions and after the predetermined time has elapsed the partner circuit is checked again to determine whether it is occupied. If it is not occupied, the image information is transmitted.

Therefore, the utilization efficiency of the apparatus is improved.

When the partner circuit is not occupied, as stated above, the documents' information is transmitted without storing it in image memory. This assures that completion stamping is carried out without fail. It is possible, therefore, to easily confirm the documents which have been transmitted.

When the partner circuit is occupied, on the other hand, the image information of documents may be stored in image memory 9 through the operation of a check key. Image information is then transmitted to the partner after the storage of all information is completed.

In the present invention, it is also possible to automatically store the image information in image memory 9, whether or not the check key is operated when the partner circuit is occupied. It is also possible, in the example in FIG. 2, to determine whether to store in image memory 9 in step 25.

In the automatically storing case, after the transmission-start key is operated, everything is done automatically. When the partner circuit is not occupied, the stored image information is read out and transmitted automatically. Thus the operation by an operator becomes very simple because documents are transmitted without requiring special operation.

An explanation will now be made on a monitoring system for use in the above facsimile apparatus according to the invention. When a communication line of a partner circuit is occupied, image information on documents is stored in image memory 9, and then the stored image information is transmitted to the partner circuit when the communication line is connected by a redialing operation carried out a predetermined time later. Through this monitoring system, it is preferable to enable a user to confirm operation results wherein the operation results relating to the image information-storing operation, the transmission operation, and so on are indicated on display portion 15 and/or printed by recording means 7.

Figure 3:
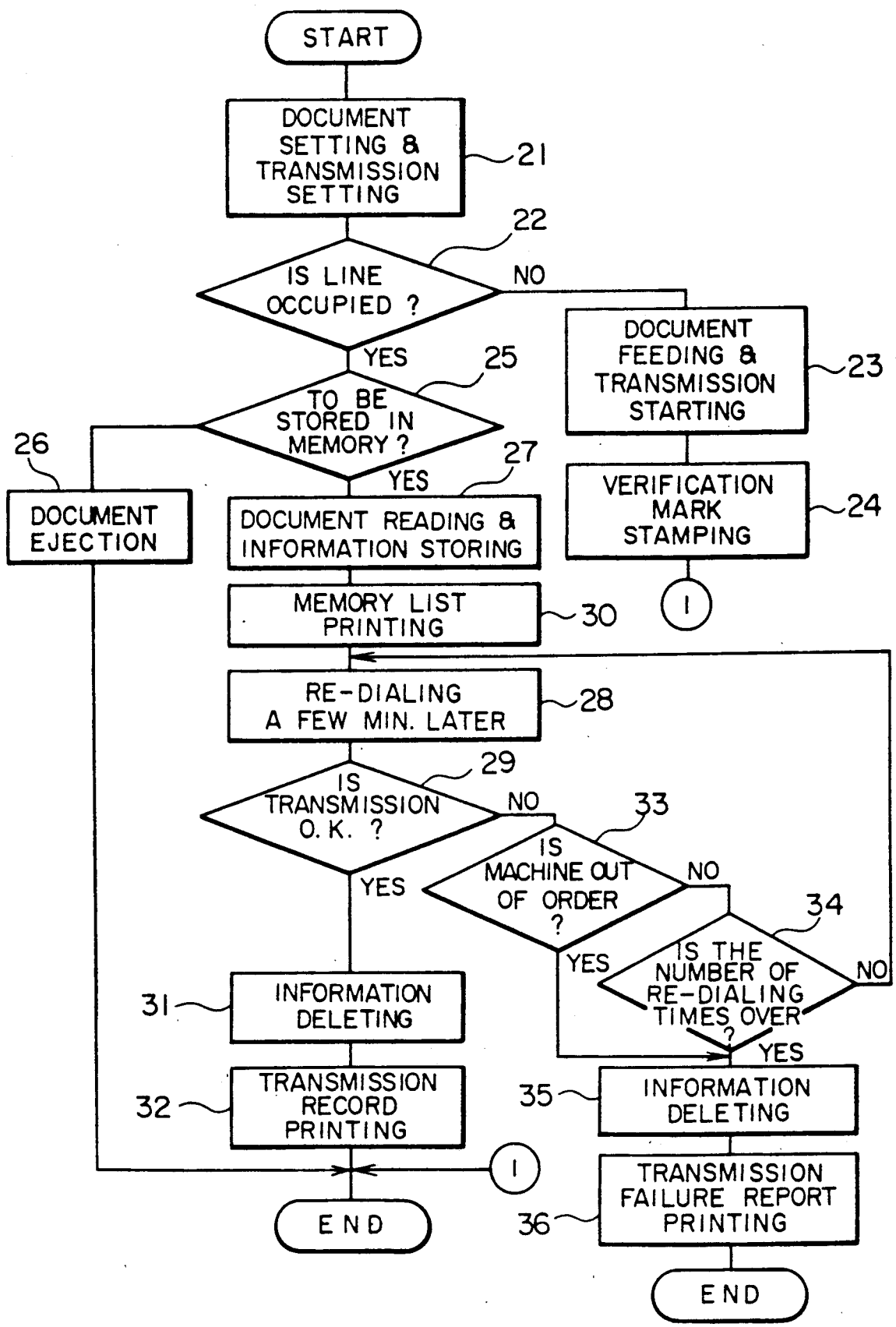
FIG. 3 is a flow chart showing another example according to the invention.

FIG. 3 is a flow chart showing an example of a transmission procedure in a facsimile machine incorporating the monitoring system. In FIG. 3, the same operations as those in FIG. 2 are represented by the same step numbers.

According to this embodiment, when documents are fed to reading means 2 to read image information due to occupation of a partner circuit and the read image information has been stored in image memory 9, some suitable messages representing the reading and storing results are indicated with an ID. No. of the documents on the display portion and/or printed on a receiving slip by recording means 7 (step 30).

During the course of storing the image information in image memory 9, when an overflow takes place in image memory 9, an overflow warning indication appears on the display portion 15 and buzzer 17 sounds, telling an operator of an insufficient capacity for the memory.

In this case, some of the documents remain unstored due to the insufficient storage. It is also possible, however, to indicate on display portion 15 the number of pages for which the information has already been stored. In this case, after transmitting the stored information corresponding to the aforesaid number of document pages, the unprocessed documents may be stacked again for transmission. It is naturally possible, in the case of the insufficient storage, to cancel all of the image information stored in image memory 9 and to take the same transmission procedure again.

The image information stored in image memory 9 at step 27 is subjected to redialing operation a predetermined time later by the same manner as mentioned in FIG. 2, (step 28). In this step, a working situation of a communication line of a partner circuit is checked, and when it is detecled that the line is unoccupied, the apparatus then is connected to the partner circuit, and the stored image information is transmitted.

In step 29, transmission results are checked. When the transmission operation for the stored image information has been completed, messages representing the completion of transmission operation are printed with the ID. No. of the corresponding documents on a transmission slip and the transmitted image information is deleted from image memory 9, (steps 31 and 32).

When the image information has not been transmitted, a judgment is made as to whether the transmission failure is caused by a machine error in the partner circuit, such as a shortage of recording paper, machine failures and so on, (step 33).

As a result, when the transmission failure is not caused by the machine error, the cause of it is deemed due to the occupation of the partner circuit. Accordingly, a check is made on the number of times the partner circuit has been redialed (step 34). When the number of redialing times has not reached a specified maximum number, process in the flow chart as shown in FIG. 3 returns to step 28 and re-transmission is attempted again by redialing operation carried out a predetermined time later.

In the case where the machine error is detected in step 33 or the number of redialing times is detected to reach the specified maximum number in step 34, the transmission to the partner circuit is deemed impossible. Thus the stored image information is deleted from image memory 9 and error messages are printed with an ID number of the corresponding document on the transmission slip.

As mentioned above, according to the invention, operation results with respect to image information are checked by the monitoring system. Then monitoring results are indicated as suitable messages on the display portion or printed on a slip by the recording means. Therefore operations required by the user may be simplified.

An explanation will now be made on an embodiment wherein a message with respect to an operation result, such as a storing result of reading and storing image information on document into image memory 9, a transmission result of dialing and transmitting the stored image information to a partner circuit and so on, is indicated on display portion 15 or printed by recording means 7. According to this embodiment of the invention, an operator may confirm the operation result through the message.

In the invention, as stated above, when the partner circuit is occupied, the image information on documents are stored once in the image memory and when the partner circuit is available and connected, the image information is read out of the image memory for the automatic transmission.

Owing to the aforesaid arrangement, when the partner circuit is not occupied, it is possible to transmit without utilizing image memory 9. Therefore, it is possible to conduct the completion stamping and easily verify whether the transmission has been carried out or not. Even when image memory 9 is used, the processes thereafter are all conducted automatically. Thus the operating procedure is greatly simplified.

Even when the circuit is occupied, it is possible to transmit other documents to other partner circuit except during the period for re-dialing the partner circuit, because no unprocessed documents are stacked on the document-stacker.

As a result, it is possible to vastly improve the utilization efficiency of a facsimile apparatus, which is an outstanding feature.

What is claimed is:

1. Facsimile apparatus comprising:
reading means for photoelectrically reading information on a document;
communication means having a communication line for calling a recipient and for transmitting the information through the communication line;
memory means for storing the information; the communication means including:
detecting means for detecting that the communication line is connected with a communication line of the recipient, for detecting that the communication line is not connected with the communication line of the recipient because the communication line of the recipient is occupied, or for detecting that the communication line is not connected with the communication line of the recipient because of a machine error in the recipient apparatus;
storing means for storing the information in the memory means when the detecting means detects that the communication line is not connected with the communication line of the recipient because the communication line of the recipient is occupied;
recalling means for recalling the recipient for a predetermined number of times when the detecting means detects that the communication line of the recipient is occupied;
transmitting means for transmitting the stored information when the recalling means recalls the recipient and the detecting means detects that the communication line is connected with the communication line of the recipient;
deleting means for deleting the stored information when the detecting means detects a machine error in the recipient apparatus and when the communication line of the recipient is occupied after the recalling means recalls the recipient for the predetermined number of times; and
indicating means for indicating that the transmitting means completed transmitting the stored information or that the stored information was deleted.

* * * * *